(12) United States Patent
Mann et al.

(10) Patent No.: US 11,554,398 B2
(45) Date of Patent: Jan. 17, 2023

(54) COMBINED ROLLING AND EXTRUDING METHOD AND THE DEVICE FOR PERFORMING THE SAME

(71) Applicant: United Company RUSAL Engineering and Technology Centre LLC, g. Krasnoyarsk (RU)

(72) Inventors: Viktor Khrist'yanovich Mann, Krasnoyarsk (RU); Viktor Fedorovich Frolov, Krasnoyarsk (RU); Aleksandr Vladimirovich Sal'nikov, Krasnoyarsk (RU); Aleksandr Gennad'evich Pelevin, Krasnoyarsk (RU); Roman Ilsurovich Galiev, Krasnoyarsk (RU); Aleksandr Yur'evich Sidorov, Krasnoyarsk (RU); Sergej Borisovich Sidel'nikov, Krasnoyarsk (RU)

(73) Assignee: UNITED COMPANY ROSAL ENGINEERING AND TECHNOLOGY CENTRE LLC, Krasnoyarsk (RU)

( * ) Notice: Subject to any disclaimer, the term of this patent is extended or adjusted under 35 U.S.C. 154(b) by 1084 days.

(21) Appl. No.: 16/306,283

(22) PCT Filed: Apr. 17, 2017

(86) PCT No.: PCT/RU2017/000239
§ 371 (c)(1),
(2) Date: Apr. 11, 2019

(87) PCT Pub. No.: WO2017/209647
PCT Pub. Date: Dec. 7, 2017

(65) Prior Publication Data
US 2019/0247903 A1    Aug. 15, 2019

(30) Foreign Application Priority Data
May 31, 2016 (RU) ................................ 2016121617

(51) Int. Cl.
*B21C 23/08* (2006.01)
*B21C 33/00* (2006.01)
(Continued)

(52) U.S. Cl.
CPC ............ *B21C 23/08* (2013.01); *B21C 23/002* (2013.01); *B21C 23/005* (2013.01);
(Continued)

(58) Field of Classification Search
CPC .. B23P 9/00; B23P 13/00; B23P 17/00; B23P 17/04; B29C 48/022; B29C 48/92;
(Continued)

(56) References Cited

U.S. PATENT DOCUMENTS 5,901,777 A * 5/1999 Matsumura ............. B21B 1/463
164/475
7,666,351 B2 * 2/2010 Nishikawa .............. C22C 23/04
420/409
(Continued)

FOREIGN PATENT DOCUMENTS

JP    H03169450 A    7/1991
RU    2100136 C1    12/1997
(Continued)

OTHER PUBLICATIONS

International Search Report and Written Opinion dated Aug. 17, 2017 in PCT/RU2017/000239.

*Primary Examiner* — Sarang Afzali
*Assistant Examiner* — Darrell C Ford
(74) *Attorney, Agent, or Firm* — Hogan Lovells US LLP (57) ABSTRACT

A method for combined rolling and extruding of cast billet is proposed. When implementing the method for combined rolling and extruding of metals or alloys, a cast billet with a predetermined temperature is fed to the working gauge, in which it is rolled and then to the die, through which the cast (Continued)

billet is extruded. When the cast billet is fed into the working gauge, a cladding layer of metal or alloy is created on the surfaces of the rolls by extruding the cast billet through the gaps formed between the surfaces of the rolls and the die. This invention makes it possible to improve the quality of the resulting products, as well as to increase the efficiency of the process as a whole.

11 Claims, 6 Drawing Sheets

(51) Int. Cl.
| | | |
|---|---|---|
| *B21C 29/00* | (2006.01) | |
| *B21C 23/00* | (2006.01) | |
| *C22F 1/04* | (2006.01) | |
| *B21C 29/04* | (2006.01) | |
| *B22D 11/00* | (2006.01) | |
| *B21B 15/00* | (2006.01) | |
| *B21B 1/46* | (2006.01) | |
| *C22F 1/047* | (2006.01) | |
| *C22F 1/05* | (2006.01) | |
| *B22D 11/06* | (2006.01) | |
| *C22F 1/043* | (2006.01) | |
| *B29C 48/00* | (2019.01) | |
| *B22D 11/12* | (2006.01) | |
| *C22C 21/00* | (2006.01) | |
| *B21B 3/00* | (2006.01) | |

(52) U.S. Cl.
CPC ............ *B21C 29/003* (2013.01); *B21C 29/04* (2013.01); *B21C 33/00* (2013.01); *B22D 11/003* (2013.01); *B22D 11/06* (2013.01); *B22D 11/0671* (2013.01); *B22D 11/12* (2013.01); *B29C 48/00* (2019.02); *C22C 21/00* (2013.01); *C22F 1/04* (2013.01); *C22F 1/043* (2013.01); *C22F 1/047* (2013.01); *C22F 1/05* (2013.01); *B21B 1/463* (2013.01); *B21B 2003/001* (2013.01); *B21B 2015/0078* (2013.01)

(58) Field of Classification Search
CPC .................. B29C 48/06; B29C 48/911; B29C 2948/92704; B29C 48/00; B21C 23/00; B21C 23/08; B21C 23/002; B21C 23/005; B21C 29/003; B21C 29/04; B21C 33/00; B22D 11/003; B22D 11/06; B22D 11/0671; B22D 11/12; C22C 21/00; C22F 1/04; C22F 1/043; C22F 1/047; C22F 1/05; B21B 1/463; B21B 2003/001; B21B 2015/0078; Y10T 29/4998; Y10T 29/49991; Y10T 29/49984; Y10T 29/49991; Y10T 29/302
USPC .................. 29/527.7, 527.1, 527.3, 33 C
See application file for complete search history.

(56) References Cited

U.S. PATENT DOCUMENTS

| | | | |
|---|---|---|---|
| 2007/0231185 A1* | 10/2007 | Nishikawa | ................ B21B 1/16 420/409 |
| 2007/0272681 A1* | 11/2007 | Yamanoi | ................ C22C 21/00 219/615 |
| 2009/0286098 A1* | 11/2009 | Yajima | .................... B29C 41/30 264/1.6 |
| 2016/0332219 A1* | 11/2016 | Shu | .................... B22D 11/0642 |
| 2022/0127702 A1* | 4/2022 | Kurosaki | ................ C22C 21/06 |
| 2022/0186344 A1* | 6/2022 | Shingu | .................... B32B 27/36 |

FOREIGN PATENT DOCUMENTS

| | | |
|---|---|---|
| RU | 2457914 C1 | 8/2012 |
| RU | 2519078 C1 | 2/2014 |
| RU | 2547775 C2 | 6/2014 |
| RU | 2568550 C2 | 3/2015 |
| RU | 2559615 C1 | 8/2015 |

* cited by examiner

COMBINED ROLLING AND EXTRUDING METHOD AND THE DEVICE FOR PERFORMING THE SAME

CROSS REFERENCE TO RELATED APPLICATION

This application is a U.S. National Phase under 35 U.S.C. § 371 of International Application PCT/RU2017/000239, filed on Apr. 17, 2017. All publications, patents, patent applications, databases and other references cited in the International Application PC T/RU2017/000239, filed on Apr. 17, 2017, all related applications referenced herein, and all references cited therein, are incorporated by reference in their entirety as if restated here in full and as if each individual publication, patent, patent application, database or other reference were specifically and individually indicated to be incorporated by reference.

PERTINENT ART

The invention relates to the field of metals deformation treatment and can be used to produce extrusions, wire rods, and sector-shaped conductors mainly of aluminium and aluminium alloys, by the method for combined rolling and extruding.

PRIOR ART

The known device and method for continuous casting under patent RU2547775, B22D11/12, published on Apr. 10, 2015. The continuous casting machine for the metal product includes a mould and a number of restrictive guide sections with rollers to guide the metal casting product coming out of the mould, which is provided with one or more restrictive guide sections of mixed type, each of which includes one or more guide rollers located on one side of the metal casting product, and insulating and/or reflecting and/or heating panels located on the opposite side of the metal casting product, with the restrictive guide sections of mixed type located in the continuation of one or more restrictive guide sections with rollers or between the restrictive guide sections with rollers. The method for continuous casting of a metal product using the machine under patent RU2547775 includes guiding of the metal casting product coming out of the mould of a continuous casting machine by means of the restrictive guide sections with rollers and the restrictive guide sections of mixed type, in which, with a decrease of the casting rate from 6-7 m/min or more to a rate of 4-5 m/min or less, the metal casting product is guided using the restrictive guide sections of mixed type by replacing at least one of the restrictive guide sections with rollers. This invention allows reducing temperature losses and adjusting thermal conditions of the casting product at the mould outlet in case of the casting rate changes.

The disadvantage of this invention is that the method for producing a cast bar with the use of additional supporting rolls does not provide for the process of its deformation treatment and obtaining the final product in the form of a bar and an extrusion.

There are the method for rolling strip metal and the corresponding rolling mill known under patent RU 2568550, B21B1/46, published on Nov. 20, 2015, according to which the strip producing unit includes:

a casting machine equipped with a mould and allowing for continuous casting of thin slabs at a low speed, in the range of approximately 3.5 metres per minute to 6 metres per minute, a rapid heating unit, a Steckel rolling mill fitted with two combined stands of reversing type, at least one rolling stand able to reduce the thickness of the newly solidified thin slab and installed in the production line immediately downstream of the said casting machine and upstream of the said rapid heating unit. The said rapid heating unit is made in the form of an induction furnace compensating at least for the temperature losses of the thin slab when it is passing through the roughing stand; also, in the production line downstream of the said induction furnace, there is a winding and unwinding device equipped with at least two cores and making it possible to alternately carry out the function of winding the strip coming from the casting machine and unwinding it for feeding to the said Steckel rolling mill.

The method for production of the strip includes:

an operation of continuous casting of a thin slab in the mould having a thickness in the range of 25 mm to 50 mm, with a speed ranging from 3.5 metres per minute to 6 metres per minute, an operation of rolling of a thin slab in at least one roughing stand to reduce its thickness to a value of 10 mm to 40 mm enabling its winding, a rolling operation, a cooling operation, and an operation of winding of the final product in the form of a strip, a rapid heating operation by electrical induction to compensate for at least thermal losses on the production line section following the casting operation and during the roughing rolling operation, winding and unwinding operations carried out by means of a winding and unwinding device provided with two cores and performed after the above-mentioned quick heating operation, at the same time, the above-said operation of rolling of the strip unwound by the said winding and unwinding device is carried out in the Steckel rolling mill furnished with two reversible stands in no more than three double passes to obtain the final product in the form of a strip with a thickness of 1.2 mm to 16 mm; thickness loss percentage in each of the rolling passes in the first stand of the two stand Steckel rolling mill is of 25% to 50%, while the thickness loss percentage of the strip in the second stand is up to 30%.

The disadvantage of the invention known from RU 2568550 is that the proposed design of the casting mill and the method do not allow producing casting products, such as bars or shapes of small cross-section.

A method for metal extrusion is known, according to which molten metal crystallisation on the surface of the rolls, metal rolling in the rolls, and extrusion in the die are combined in one process operation (patent RU2519078). At the extrusion stage, direct extrusion, angular extrusion, and repeated direct extrusion are carried out in sequence combined with forming of the final product. In this way, a high level of accumulated deformation is reached and the required uniformity of the semi-finished product properties is provided.

The disadvantage of the known method is its poor performance due to the need to overcome the high passive friction forces arising in the tool in the process of equal-channel extrusion. In this case, the power of the active friction forces in the deformation zone is limited by the design of the rolls. In addition, when combining the processes of casting, rolling, and equal-channel angular extruding, it becomes difficult to remove a large amount of heat generated as a result of deformation heating, which reduces the wear resistance of the tool and limits the range of the aluminium alloys which can be used.

The prototype of the proposed method in terms of technical substance and the achieved result is the combined process of continuous casting and extruding of non-ferrous metals (patent RU No 2100136), including molten metal crystallisation in the rotary mould, metal rolling in the rolls, die extruding, cooling, and subsequent winding of the extruded semi-finished product.

The disadvantage of the method is the instability of the properties of the extruded semi-finished product due to the lack of the temperature stabilising element of the cast bar upstream of the rolls. These wedge-shaped cavities on the die make the die production process more difficult and shorten the duty life of the tool (low wear resistance).

A similar device for continuous casting, rolling, and extruding of wire rods is known (patent RU2559615). The device can be used to produce solid and hollow extruded products from metals and alloys.

The disadvantage of this similar device is that when the liquid metal is fed into the working gauge, appearance of oxides, non-metallic inclusions and gas porosity becomes possible. This reduces the quality of semi-finished products, leads to heterogeneity of the properties of the final product, and adversely affects the mechanical properties, such as ultimate tensile strength and relative elongation. The low efficiency of the cooling process during the crystallisation of the metal on the rolls does not allow to achieve high performance.

The closest in terms of technical substance to the proposed device is a device for continuous combined rolling and extruding of long products (patent for utility model RU122315). This device may be used to produce long products in the form of wire rods, bars, and wires with a relatively small cross section mainly of non-ferrous metals and alloys by the method for continuous combined rolling and extruding. The device for continuous combined rolling and extruding includes a grooved roll and a finned roll forming the working gauge, at the outlet of which the die holder with a clamping device is installed. In the groove of the die holder, a die in the form of a straight trapezoidal prism with cooling channels is installed and the die consists of several components and includes a calibration and guide parts.

The design disadvantage of the prototype is that the design of the die holder does not provide fixation of the replaceable part of the die by rotation around the extruding axis. This does not make it possible to provide a uniform gap on the contact surface of the movable rolls and the fixed die and the steel-to-steel contact results in intensive wear of these parts.

DISCLOSURE OF INVENTION

The technical result of the present invention consists in improving the quality of the obtained long products, increasing the uniformity of their mechanical properties, as well as increasing the efficiency of the rolling and extruding processes of the cast billet by reducing energy consumption, eliminating internal defects, increasing the service life of the rolls and the die, and reducing the return loss of metal in the extruding process.

This technical result is achieved by the proposed device for combined rolling and pressing of the cast billet, which includes:

a rotary mould forming a cast billet of an infinite length, a grooved roll and a finned roll forming a working gauge, at the outlet of which a die is installed in the groove of the die holder, a temperature control device of the cast billet installed upstream of the rolls, while the guide elements are placed upstream of the working gauge, installed with the possibility of fixing the cast billet at an angle to or parallel to the extruding axis, the upper part of the finned roll fin has a T-shaped surface, the grooved roll includes some fins and the finned roll includes some grooves that are placed relative to each other so that the fins and the grooves form a labyrinth coupling of the said rolls with each other, the die is made with the possibility of fixing its position relative to the die holder by means of mating grooves and fins made in the die and the die holder, and between the surfaces of the rolls and the die in the working gauge, there are gaps.

The proposed device is complemented by special versions of its design.

According to the proposed option, the working part of the die in contact with the deformation zone of the cast billet in the working gauge can have a T-shaped section.

The part of the die fixed in the die holder can have a cylindrical shape.

According to one of the proposed options, a gap is made between the side surfaces of the roll groove and the contact surfaces of the die, the width of which can be of 0.2 to 0.5 mm.

According to one of the proposed options, a gap is made between the side surfaces of the roll groove and the non-contact surfaces of the die, the width of which can be of 2.0 to 3.0 mm.

According to one of the proposed options, the die is installed in the working gauge, with a gap between the surface of the die and the surface of the top of the roll fin and with a gap between the surface of the die and the bottom of the roll groove; the width of these gaps can be of 1.0 to 2.0 mm.

Some internal cooled channels can be made around the entire circumference of the rolls and some channels for supply and removal of the coolant can be also made at the outlet of the die in the die holder.

According to one of the proposed options, the device for controlling the temperature of the cast billet is a combined assembly including a heating device and a cooling device. The heating device can be an inductor designed for induction heating of the cast billet at a temperature of the billet below the specified value. The cooling device can be a cooler, in which the cast billet is irrigated with a coolant if the temperature of the cast billet is higher than the specified temperature.

The fin of the finned roll can have such configuration, at which the ratio of the height of the belt to the width of the fin makes 0.07-0.08.

According to one of the proposed options, the working part of the die having a T-shaped section has a ratio of the height of the belt to the width of the die equal to 0.08-0.09.

The feed angle of the cast billet relative to the extruding axis is of 0 to 20 degrees, preferably of 5 to 20, preferably of 10 to 20.

According to one of the proposed options, a gap between the contact surfaces of the T-shaped fin of the roll and the side surfaces of the groove of the roll can be made of 0.2 to 0.5 mm in width. At the same time, between the non-contact surfaces of the T-shaped fin of the roll and the side surfaces of the roll groove, the width of the gap can be of 2.0 to 3.0 mm According to one of the proposed options, the claimed device may additionally include a device for cooling the extruded long product.

This technical result is also achieved through the method for combined rolling and extruding of metals or alloys, including the following stages:

the cast billet is crystallised, the cast billet with a preset temperature is fed into the working gauge formed by two rolls, in which the billet rolling is carried out, and then to the die, through which the billet extrusion is carried out, the ready-made extruded products are obtained, while before feeding the cast billet into the working gauge, the temperature of the cast billet is adjusted by additional heating or cooling, feeding of the cast billets into the working gauge is carried out at an angle to the extrusion axis or parallel to this axis, when the cast billet is fed into the working gauge, a cladding layer of metal or alloy is created on the surfaces of the rolls by extruding the cast billet through the gaps formed between the surfaces of the rolls and the die.

The proposed method makes it possible to obtain ready-made long extruded products with an elongation ratio of 5.2 to 16.8.

The proposed method can be used for rolling and extruding aluminium or aluminium alloys.

According to one of the proposed options, casting of metal into the mould can be carried out parallel to the horizontal axis of the mould.

The temperature of the cast billet before feeding onto the surface of the rolls is maintained in a range of 380 to 420° C., preferably in the range of 400 to 420° C.

According to one of the proposed options, the cast billet is inductively heated, if its temperature is lower than the set temperature, or cooled by spraying some coolant on its surface, if its temperature is higher than the desired value.

According to the proposed option, the supply of the cast billet onto the surface of the rolls is carried out at an angle to the extruding axis, ranging from 0 to 20 degrees, preferably from 5 to 20 degrees, preferably from 10 to 20 degrees.

The invention essence is explained by the drawings.

The schematic view of the device is shown in FIG. 1

The schematic diagram of the groove-fin connection in section of the rolls is shown in FIG. 2.

The schematic diagram of the die-grooved roll section is illustrated in FIG. 3.

The schematic diagram of the die holder-die connection section is shown in FIG. 4.

The fin geometric dimensions ratio is shown in FIG. 5.

The die geometric dimensions ratio is described in FIG. 6.

DETAILED DISCLOSURE OF THE INVENTION

Figure 1:
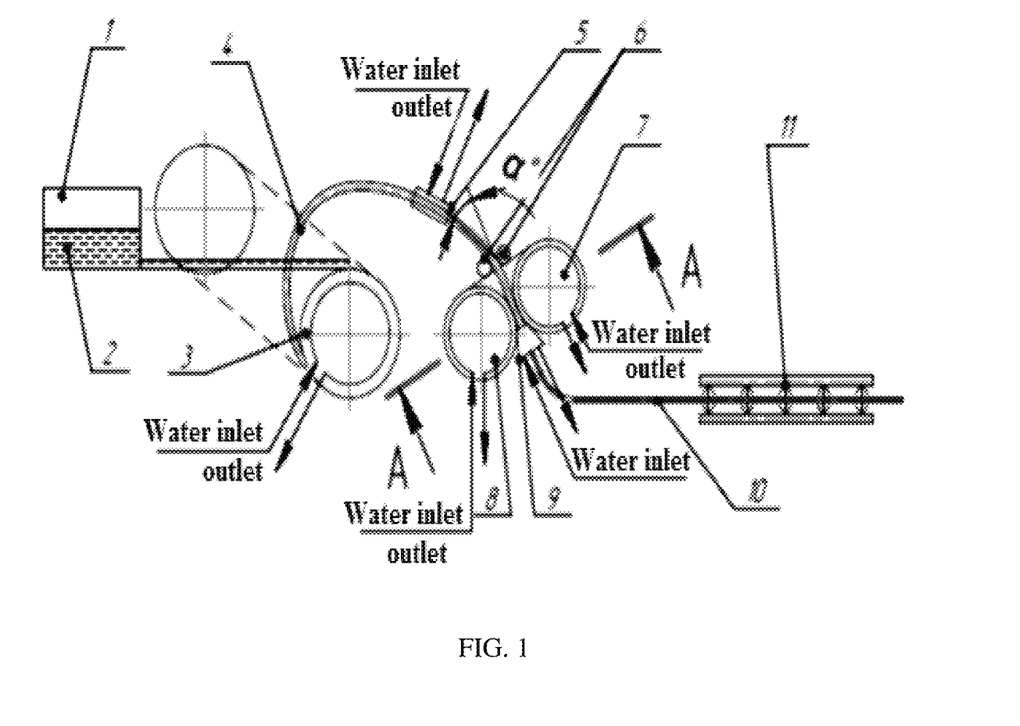

The combined rolling and extruding device (FIG. 1) includes:

a holding furnace 1 with liquid aluminium or aluminium alloy 2, a rotary mould 3 forming a cast billet 4 of an infinite length, a temperature control device 5 for the cast billet, the rollers of a guide element 6, a grooved roll 7 and a finned roll 8 and a die 9 forming a closed working gauge (FIG. 2) for extruding a semi-finished product 10, and a semi-finished product cooling device 11.

Figure 2:
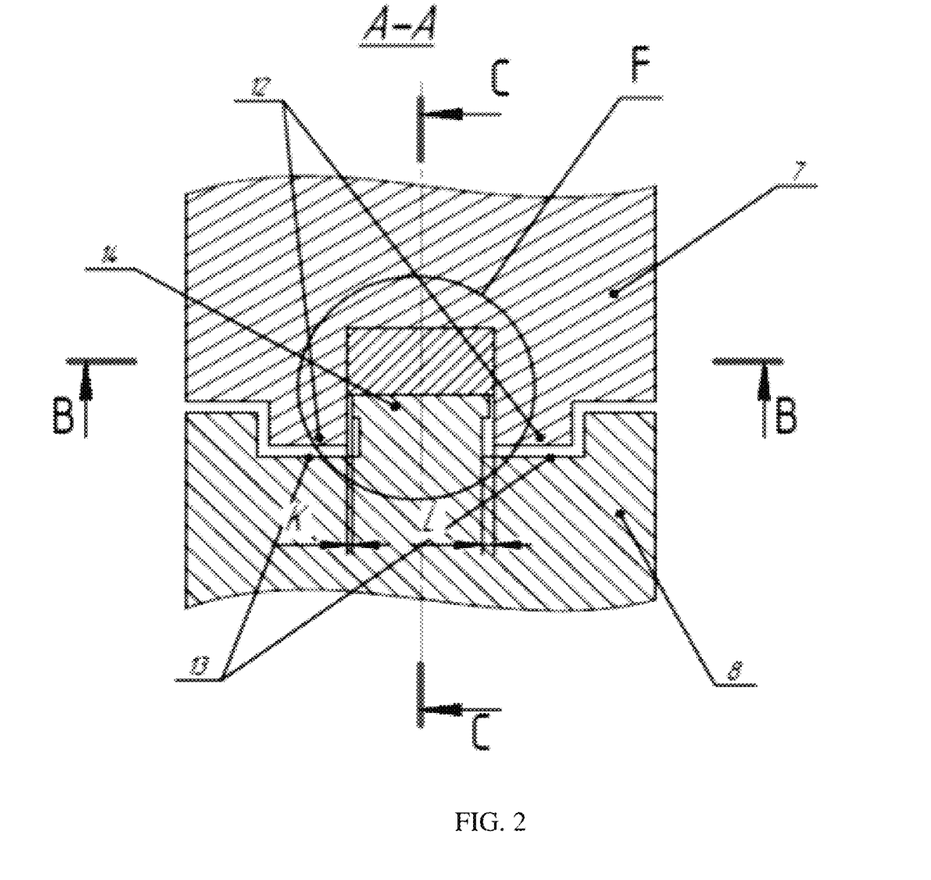
Figure 5:
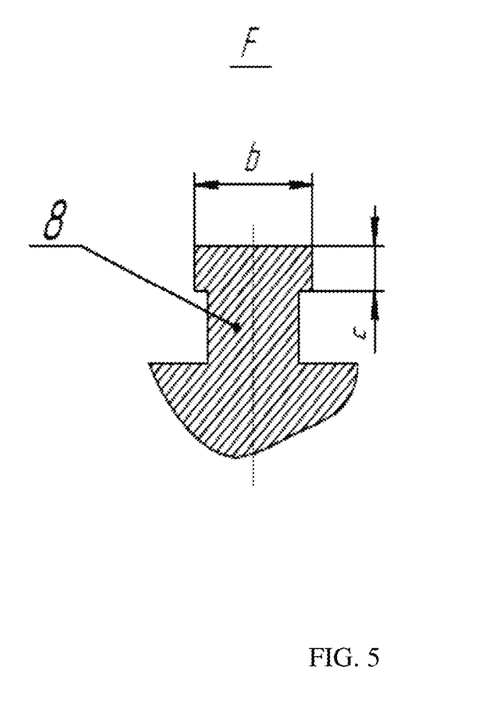

The cylindrical surface of the grooved roll 7 is provided with fins 12 coupled with grooves 13, made on the cylindrical surface of the finned roll 8. The said fins and grooves on the surface of the rolls 7 and 8 form a labyrinth coupling of the said rolls with each other. During the operation of the unit, a deformation zone is created inside the working gauge due to the active friction forces. A fin 14 of the roll 8 has a T-shaped working surface at the site of mating with the deformation zone (shaded area in FIG. 2). The T-shaped fin of the roll 8 is positioned with respect to the groove of the roll 7 with the possibility of forming a gap K between the side surfaces of the groove of the roll 7 and the contact surfaces of the fin of the roll 8 (FIG. 2). The width of the gap K is of 0.2 to 0.5 mm. Between the contact surfaces of the groove of the roll 7 and the non-contact surfaces of the fin of the roll 8, a gap L equal to 2.0-3.0 mm is provided. The T-shaped fin of the roll 8 (FIG. 5) has a ratio of the height of the belt c to the width of the fin b equal to 0.07-0.08.

Figure 3:
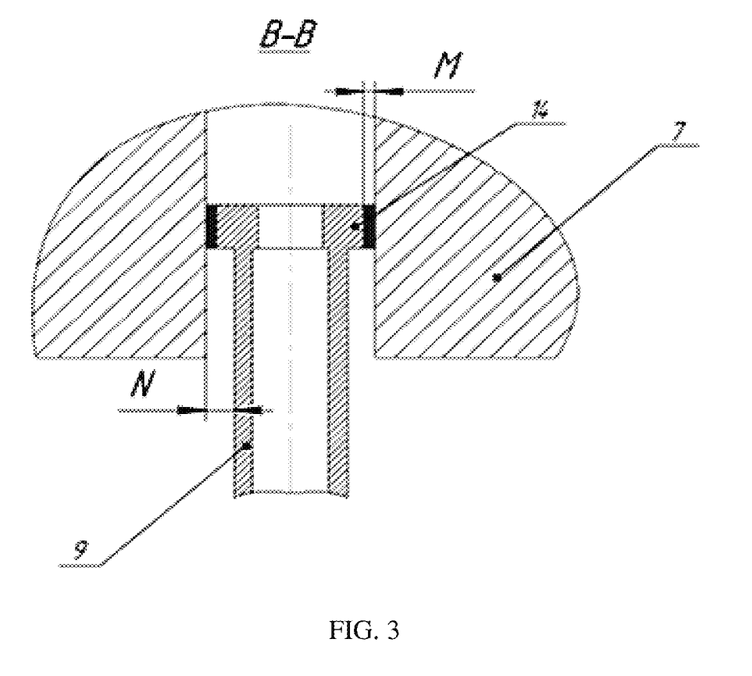

The die 9 (FIG. 3) has a T-shaped working surface 14 coupled with the deformation zone and the side surfaces of the roll 7. At the same time, between the side surfaces of the roll 7 and the contact surfaces of the die 9, a gap M with a width of 0.2-0.5 mm is provided. Between the contact surfaces of the groove of the roll 7 and the non-contact surfaces of the die 9, a gap N equal to 2.0-3.0 mm is provided.

Figure 6:
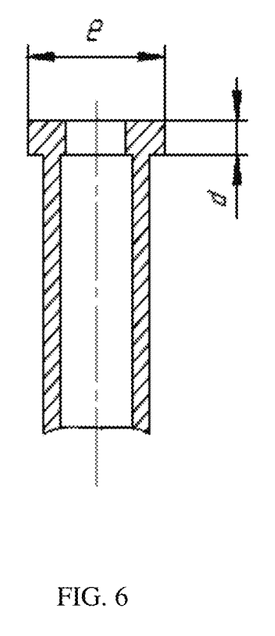

The working part of the die (FIG. 6) has a ratio of the height of the belt d to the width of the die e equal to 0.08-0.09.

Figure 4:
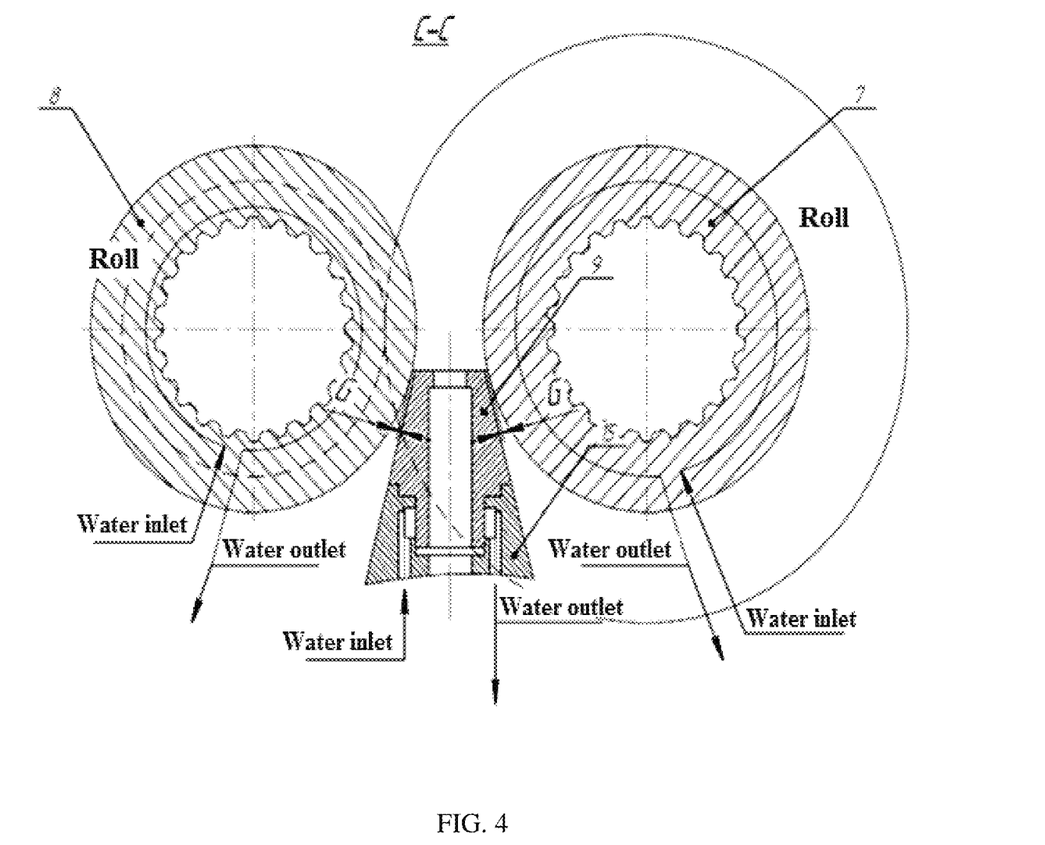

The die 9 (FIG. 4) and the die holder 15 have the mating rectangular fins and grooves designed to prevent rotation of the cylindrical part of the die 9 relative to the die holder 15.

The die holder provides installation of the die in the working gauge with a gap G between the following surfaces: the top of the fin of the roll—the die and the bottom of the groove of the roll—the die equal to 1 to 2 mm.

Due to the presence of the gaps between the working surfaces of the rolls and the working surfaces of the rolls and the matrix, the contact between the steel surfaces is excluded, which increases their service life. In the process of extrusion, a cladding layer of metal or alloy, for example, aluminium or its alloy, is formed on the contact surfaces of the rolls thereby increasing the power of the active friction forces due to the metal-metal friction coefficient, in a particular case, this can be a cladding layer of aluminum-aluminum. At the same time, the die forms a cladding layer of metal on the rolls by the faces of its working surfaces.

The thickness of the metal or alloy cladding layer on the working surfaces of the groove and the fin of the rolls 7 and 8 is equal to 0.2 to 2.0 mm.

As was already mentioned, the T-shape of the working part 14 of the die 9 allows creating a gap G between the side surfaces of the groove and the contact surfaces of the die. Due to the presence of a gap M between the side surfaces of the groove and the contact surfaces of the die and the die holder, and the rigid positioning of the die 9 relative to the die holder 15 and the rolls 7 and 8, the steel-to-steel contact is excluded and the wear of the die is reduced.

As was already mentioned, the T-shape of the die also ensures the presence of gaps N between the side surfaces of the groove and the non-contact surfaces of the die and the die holder. The presence of the gaps M and N eliminates formation of the ridge and loss of metal from the working gauge in the die-groove mating during extrusion.

Internal cooled channels are made around the entire circumference of the rolls 7 and 8.

The coolant supply and removal channels are installed at the outlet of the die 9.

The device 5 of temperature control of the cast billet provides the billet optimum temperature of 380-420° C. to ensure the stable extruding process and stable properties of the extruded long semi-finished products regardless of the casting conditions and the cast billet temperature at the outlet of the mould. The temperature stabilisation device is a combined assembly consisting of an inductor (for heating the cast billet at a temperature below the nominal) and a cooler (for cooling the cast billet at a temperature above the nominal). Heating of the cast billet is carried out by induction heating; cooling of the cast billet is carried out by irrigation. Control of the set temperature of the cast billet is carried out in a contactless way, for example, using a pyrometer. The set temperature of 380-420° C. provides sufficient strength of the cast billet in the hot state for its accurate positioning in the working gauge of the rolls 7 and 8 by the guide device 6.

From the holding furnace 1 metal or metal alloy (for example, aluminium or aluminium alloy) 2 is horizontally fed to the rotary mould 3, in which a continuous cast billet 4 is formed. The cast billet 4, after passing through the temperature stabilisation device 5 and the rollers of the guide element 6, enters the working gauge formed by the rolls 7, 8. The guide element 6 provides the cast billet feeding into the rolls at an angle α to the extrusion axis ranging from 0 to 20°. At the same time, by maintaining the optimum temperature of the cast billet 4 and selecting the optimal angle α of the cast billet to the extrusion axis, the stability of the process of feeding the cast billet into the roll gauge is ensured. The cast billet 4 is captured by the rolls 7 and 8, due to the active friction forces in the working gauge, extruded through the calibrated opening of the die 9; the resulting extruded semi-finished product 10 is cooled in the cooling device 11. The T-shape of the fin 14 of the roll 8 provides a gap K between the side surfaces of the roll 7 and the contact surfaces of the fin of the roll 8, a gap L between the side surfaces of the grooves of the roll 7 and the non-contact surfaces of the fin of the roll 8. Thanks to this, the steel-to-steel contact in the groove-to-fin mating is eliminated and the rolls wear is reduced. In the process of extrusion, the metal or alloy, coming out of the gauge formed by the rolls 7 and 8 locked by the die 9, fills the gap L, at the same time due to the presence on the cylindrical surfaces of the labyrinth formed by the fins 12 of the roll 7 and the grooves 13 of the roll 8; further metal exit from the gauge is excluded. Thus, the formation of the ridge and loss of metal from the working gauge is excluded thanks to the self-sealing of the groove-to-fin mating by the layer of aluminium or alloy formed in the gap L.

Thanks to this invention, when implementing the combined rolling and extruding process, the return loss of metal is reduced, the energy consumption of the process is reduced, the quality and homogeneity of the extruded semi-finished products is increased, and the performance is increased.

An Example of a Specific Implementation of the Method and Device.

As an example of practical use of the device, an example of deformation of a continuous cast billet on the experimental industrial line LPA 6 is given. Casting with obtainment of a continuous cast billet of 40λ37 mm in section was carried out in a rotary mould with a diameter of 1,510 mm. Continuous combined rolling and extruding was carried out on a CREP unit with the diameter of the cooled rolls of 428 mm with the rotation speed of the rolls of 3 to 12 rpm. The melt temperature was 750° C.; the temperature of the cast billet at the outlet of the rotary mould was 520° C.; the temperature of the cast billet after the temperature stabilisation device at the inlet to the gauge was maintained in a range of 380-420° C. A heat-resistant Al—Zr alloy was used containing the following % wt.: 0.1 of silicon; 0.25 of iron; 0.28 of zirconium; the rest was aluminium. Extrusion was carried out by means of dies with extrusion ratio μ of 5.2 to 16.8 followed by cooling and winding of the extruded bar. A pilot batch of 9.5 mm wire rod of Al—Zr alloy in the volume of 6 t was obtained. Samples for tensile strength and electrical conductivity testing were cut from the extruded bars; their ultimate tensile strength σ, relative elongation δ, and specific electrical conductivity were estimated based on the test results. The obtained coils were subjected to thermal annealing. After thermal annealing, the samples were taken for tensile strength and electrical conductivity testing. The test results of the samples of the extruded bar and the wires are given in table 1.

TABLE 1

| Sample condition | Ultimate tensile strength (σt), MPa | Electrical resistance, Ohm * mm²/m | Relative elongation δ, % |
|---|---|---|---|
| Bar of 9.5 mm in diameter after extrusion | 147.5 | 0.03357 | 6 |
| Bar of 9.5 mm in diameter after extrusion and thermal annealing | 127.9 | 0.02799 | 19.5 |

Thermal treated coils of the extruded bar were further drawn into a wire down to 3.50 mm in diameter. Wire drawing was performed on a wire-drawing machine without slippage. The drawing speed on the diameter of 3.50 mm was of 7.21 m/sec. Lubricating and cooling fluid was used to lubricate the drawing dies. The drawing sequence was as follows: 9.5-8.0-6.92-5.93-5.04-4.32-3.71-3.50.

The test results of wires of 3.50 mm in diameter are given in table 2

TABLE 2

| Sample condition | Ultimate tensile strength (σt), MPa | Electrical resistance, Ohm * mm²/m | Relative elongation Δ, % |
|---|---|---|---|
| Wire of 3.50 mm in diameter after drawing | 184 | 0.027615 | 2.5 |

After drawing, 15 samples of wires with a diameter of 3.50 mm were selected for thermal stability tests. Heat treatment of the wire samples was carried out in a laboratory furnace at temperatures of 230, 280, and 400 during 1 hour. After heat treatment, the samples were air cooled.

The results of the tests of the mechanical properties and electrical conductivity of the heat treated wires are given in table 3.

TABLE 3

| | 230° C. | | 280° C. | | 400° C. | |
|---|---|---|---|---|---|---|
| Wire size (mm) | Ultimate tensile strength (σt), MPa | Softening, % | Ultimate tensile strength (σt), MPa | Softening, % | Ultimate tensile strength (σt), MPa | Softening, % |
| 3.50 | 180 | 97.8 | 179 | 97.3 | 161 | 90.0 |

Thus, the test results showed that the wire made of Al—Zr alloy wire rod obtained by the proposed method for combined rolling and extruding meets the requirements of AT1, AT3, and AT 4 types of the international standard IEC 62004.

We claim:

1. A method for combined continuous casting, rolling, and extrusion of a metal billet, including the following steps:
   forming and crystallizing a continuous cast billet in a mold,
   regulating the temperature of the cast billet, and
   rolling the cast billet with a preset temperature in a working gauge formed by two rolls and then extruding the cast billet through a die,
   wherein the continuous cast billet is rolled so that gaps are formed between working surfaces of the rolls and working surfaces of the die, wherein a metal of the cast billet, when the cast billet is fed into the working gauge, is extruded through the gaps to form a cladding layer of metal on surfaces of the rolls.

2. The method described in claim 1, according to which the billet is extruded with an elongation ratio of 5.2 to 16.8.

3. The method described in claim 1, according to which the mold is a rotary mold and metal is fed into the mold horizontally.

4. The method described in claim 1, according to which the temperature of the continuous cast billet, before the cast billet is fed into the working gauge, is 380 to 420° C.

5. The method described in claim 4, according to which the temperature of the continuous cast billet, before the cast billet is fed into the working gauge, is 400 to 420° C.

6. The method described in claim 1, according to which the cast billet is inductively heated when the temperature of the continuous cast billet is lower than a set temperature.

7. The method described in claim 1, according to which the cast billet is cooled when the temperature of the continuous cast billet is higher than a set temperature.

8. The method described in claim 7, according to which the billet is cooled by supplying some coolant on to a surface of the billet.

9. The method described in claim 1, according to which the continuous cast billet is fed into the working gauge, which is formed by two rolls locked by a die with a calibrated opening at an angle to the die axis or parallel to said axis.

10. The method described in claim 9, according to which the continuous cast billet is fed into the working gauge at an angle of 0 to 20 degrees to the die axis.

11. The method described in claim 1, according to which the continuous billet is formed from aluminum or an aluminum alloy.

* * * * *